United States Patent
Fujimoto et al.

(10) Patent No.: US 12,225,103 B2
(45) Date of Patent: Feb. 11, 2025

(54) TIME SYNCHRONIZATION SYSTEM, RECEIVING SERVER AND TIME SYNCHRONIZATION METHOD

(71) Applicant: Nippon Telegraph and Telephone Corporation, Tokyo (JP)

(72) Inventors: Kei Fujimoto, Musashino (JP); Masashi Kaneko, Musashino (JP); Takeshi Fukumoto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 222 days.

(21) Appl. No.: 18/025,512

(22) PCT Filed: Sep. 15, 2020

(86) PCT No.: PCT/JP2020/034811
§ 371 (c)(1),
(2) Date: Mar. 9, 2023

(87) PCT Pub. No.: WO2022/059049
PCT Pub. Date: Mar. 24, 2022

(65) Prior Publication Data
US 2024/0014999 A1    Jan. 11, 2024

(51) Int. Cl.
*H04Q 11/00*      (2006.01)
*H04B 10/073*   (2013.01)
(Continued)

(52) U.S. Cl.
CPC ......... *H04L 7/0075* (2013.01); *H04B 10/073* (2013.01); *H04J 3/0638* (2013.01);
(Continued)

(58) Field of Classification Search
CPC .... H04B 10/073; H04J 3/0638; H04L 7/0075; H04Q 11/0062; H04Q 2011/0045;
(Continued)

(56) References Cited

U.S. PATENT DOCUMENTS

2007/0121507 A1* 5/2007 Manzalini ........... H04L 47/2433
                                                                          370/235
2010/0040369 A1* 2/2010 Zhao .................. H04Q 11/0067
                                                                          398/58
(Continued)

FOREIGN PATENT DOCUMENTS

JP          2007124029         5/2007
JP          2007158425         6/2007
(Continued)

OTHER PUBLICATIONS

[No Author Listed] [online], "Precision Time Protocol (PTP/IEEE-1588)," EndRun Technologies, retrieved on Sep. 10, 2020, retrieved from URL <https://endruntechnologies.com/pdf/PTP-1588.pdf>, 6 pages.

(Continued)

*Primary Examiner* — Li Liu
(74) *Attorney, Agent, or Firm* — Fish & Richardson P.C.

(57) ABSTRACT

In a time synchronization system, a network controller sets transmission distance information on a transmission distance through which an optical signal is transmitted between transmission and receiving servers via a queueless network to a receiving server, based on network topology information. The transmitting server transmits a transmitting side current time synchronized with a reference time to the receiving server 12 via the queueless network. The receiving server calculates a transmission delay time between the transmission and receiving servers by dividing the transmission distance, which is based on the set transmission distance information, by light speed in the queueless network. A receiving side current time is calculated by adding the transmission delay time to the transmitting side current time.

6 Claims, 7 Drawing Sheets

(51) Int. Cl.
*H04J 3/06* (2006.01)
*H04L 7/00* (2006.01)

(52) U.S. Cl.
CPC . *H04Q 11/0062* (2013.01); *H04Q 2011/0045* (2013.01); *H04Q 2011/0079* (2013.01); *H04Q 2213/13214* (2013.01); *H04Q 2213/36* (2013.01)

(58) Field of Classification Search
CPC . H04Q 2011/0079; H04Q 2213/13214; H04Q 2213/36
USPC ......................................................... 398/154
See application file for complete search history.

(56) References Cited

U.S. PATENT DOCUMENTS

| | | | | |
|---|---|---|---|---|
| 2013/0315606 | A1* | 11/2013 | Lanzone | H04J 3/065 |
| | | | | 398/154 |
| 2014/0079409 | A1* | 3/2014 | Ruffini | H04J 3/0667 |
| | | | | 398/154 |
| 2014/0255022 | A1* | 9/2014 | Zhong | H04Q 11/0066 |
| | | | | 398/16 |
| 2014/0270804 | A1* | 9/2014 | Hoshida | H04J 14/0272 |
| | | | | 398/154 |
| 2018/0375603 | A1* | 12/2018 | Mayer | H04W 56/001 |
| 2021/0006334 | A1* | 1/2021 | Yoshino | H04B 10/27 |
| 2021/0336762 | A1* | 10/2021 | Qi | H04B 10/66 |

FOREIGN PATENT DOCUMENTS

| | | | | |
|---|---|---|---|---|
| JP | 2007524263 | | 8/2007 | |
| JP | 2013251828 | | 12/2013 | |
| JP | 2013251828 | A * | 12/2013 | |
| JP | 2014096853 | | 5/2014 | |
| JP | 2014096853 | A * | 5/2014 | ............ G04R 20/26 |
| JP | 2017022526 | | 1/2017 | |
| JP | 2017022526 | A * | 1/2017 | |

OTHER PUBLICATIONS

Arai et al., "Frequency shifter Type Hop Count Indication Method in WDM Photonic Networks," Journal of the Information Processing Society of Japan, Mar. 15, 2003, 44(3):527-53 (English Abstract).
Hashimoto, "Seiko's measure for "Leap Second" (5th issue); The reason why PTP is highly accurate," Seiko Solutions Inc., retrieved on Sep. 10, 2020, retrieved from URL <https://www.seiko-sol.co.jp/leap-second/no-05/>, 10 pages (with English Translation).
PCT International Search Report in International Appln. No. PCT/JP2020/034811, dated Feb. 9, 2021, 3 pages.

* cited by examiner

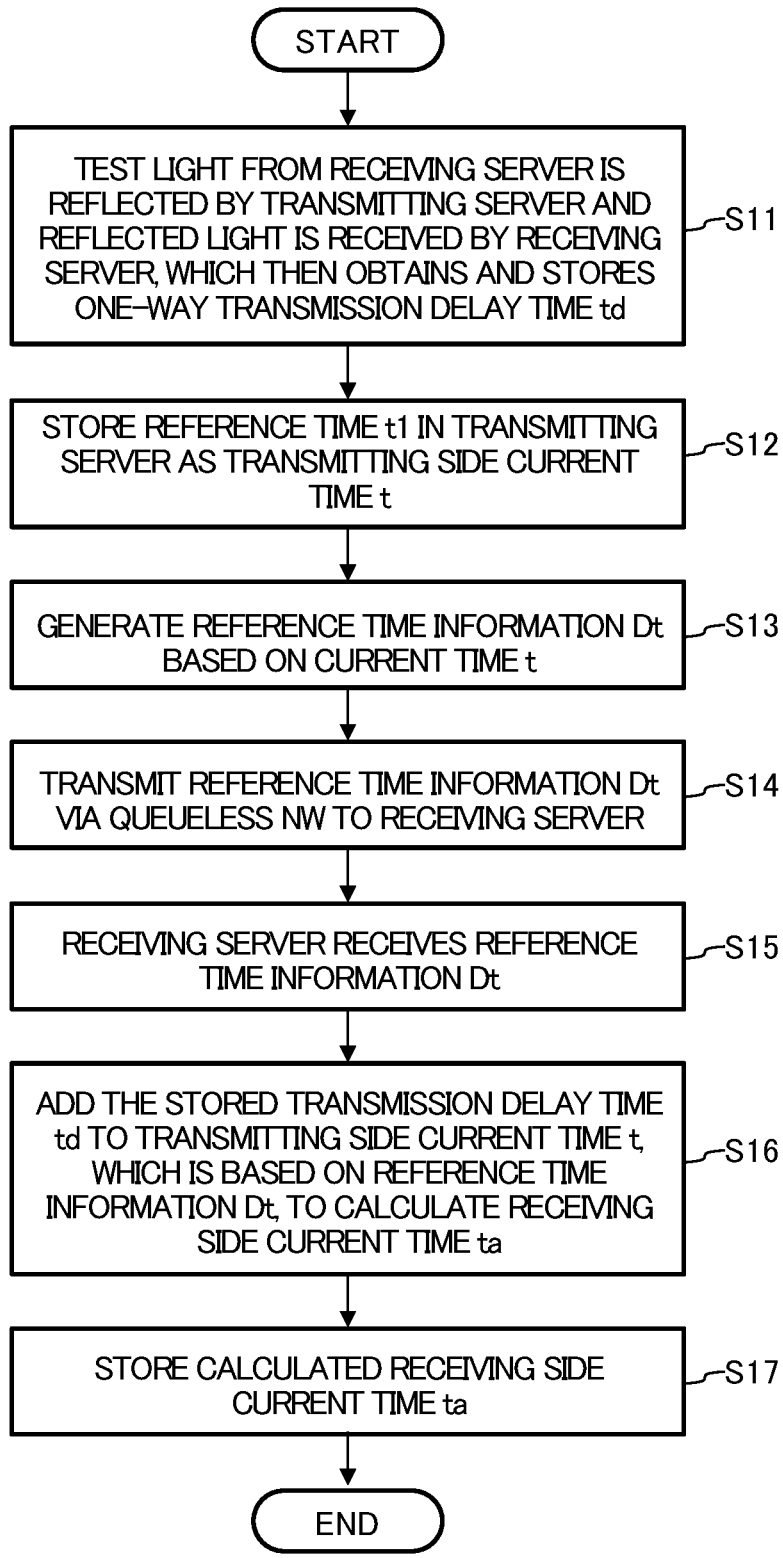

TIME SYNCHRONIZATION SYSTEM, RECEIVING SERVER AND TIME SYNCHRONIZATION METHOD

CROSS-REFERENCE TO RELATED APPLICATIONS

This is a National Stage Application of PCT Application No. PCT/JP2020/034811, filed on Sep. 15, 2020. The disclosure of the prior application is considered part of the disclosure of this application, and is incorporated in its entirety into this application.

TECHNICAL FIELD

The present invention relates to a time synchronization system for controlling time synchronization between servers connected to a network, a receiving server, and a time synchronization method.

BACKGROUND ART

In the Internet Protocol (IP) network represented by the Internet or the like, a transmitting server and a receiving server are connected to a network via a router and a switch (described later), and IP packets (for example, a time packet including time information) are transmitted from the transmitting server and received by the receiving server. The switch is a switch according to L2 and L3 of the Open Systems Interconnection (OSI) reference model.

In the event of reception of a packet by the receiving server, the Network Time Protocol (NTP) or the Precision Time Protocol (PTP), described later, is used to synchronize the time between the transmission and receiving servers. NTP is a protocol for synchronizing the time between computers and various communication devices connected to a network. The PTP is a protocol used to synchronize clocks over the entire network to which computers and various communication devices are connected. As this type of technology, there are technologies disclosed in Patent Literatures 1 and 2 and Non Patent Literatures 1 and 2.

CITATION LIST

Patent Literature

Patent Literature 1: JP 2007-124029 A
Patent Literature 2: JP 2007-158425 A

Non Patent Literature

Non Patent Literature 1: Naoya Hashimoto, "Seiko's measure for "Leap Second" (5th issue); The reason why PTP is highly accurate" [online], Seiko Solutions Inc., [searched on Sep. 10, 2020], Internet <https://www.seiko-sol.co.jp/leap-second/no-05/>
Non Patent Literature 2: "Precision Time Protocol (PTP/IEEE-1588)" [online], EndRun TECHNOLOGIES, [Searched on Sep. 10, 2020], Internet <https://endrun-technologies.com/pdf/PTP-1588.pdf>

SUMMARY OF THE INVENTION

Technical Problem

In the network described above, a time packet transmitted from a transmitting server is queued by a router or a switch when the network is congested. Therefore, the time for a packet to arrive from the transmitting server to the receiving server fluctuates (varies) in a manner depending on the congestion status or the like. Due to this fluctuation, even when NTP or PTP is used, the time for a time packet to arrive is not constant, and thus a time synchronization error occurs. Therefore, there is a problem that time synchronization cannot be achieved between the transmitting server and the receiving server via the network.

The present invention has been made in view of such circumstances, and an object thereof is to enable time synchronization between a transmitting server and a receiving server via a network.

Solution to Problem

In order to solve the above problem, a time synchronization system according to the present invention includes: a queueless network (NW) formed by connecting a plurality of optical cross connects (OXCs) by optical fibers, each of the plurality of OXCs configured to perform switching processing of performing transmission of an optical signal while switching the optical signal to a destination route in the form of light; and an NW controller, a transmitting server, and a receiving server, which are connected to the queueless NW so as to be able to transmit an optical signal. The NW controller is configured to perform processing of setting, based on NW topology information related to the queueless NW, transmission distance information on a transmission distance through which an optical signal is transmitted from the transmitting server to the receiving server via the queueless NW to the receiving server. The transmitting server is configured to perform processing of: receiving a reference time that ticks at regular intervals; generating reference time information based on a transmitting side current time synchronized with the received reference time; and transmitting an optical signal on which the generated reference time information is superimposed to the receiving server via the queueless NW. The receiving server is configured to perform processing of: after receiving the reference time information, dividing the transmission distance, which is based on the transmission distance information set by the NW controller, by a light speed, which is an optical signal speed in the queueless NW, to calculate a transmission delay time between the transmitting server and the receiving server; and adding the calculated transmission delay time to the transmitting side current time, which is based on the reference time information, to calculate a receiving side current time.

Advantageous Effects of Invention

With the present invention, it is possible to enable time synchronization between a transmitting server and a receiving server via a network.

BRIEF DESCRIPTION OF THE DRAWINGS

FIG. 7 is a flowchart for explaining a time synchronization operation of the time synchronization system of the second embodiment.

DESCRIPTION OF EMBODIMENTS

Figure 1:
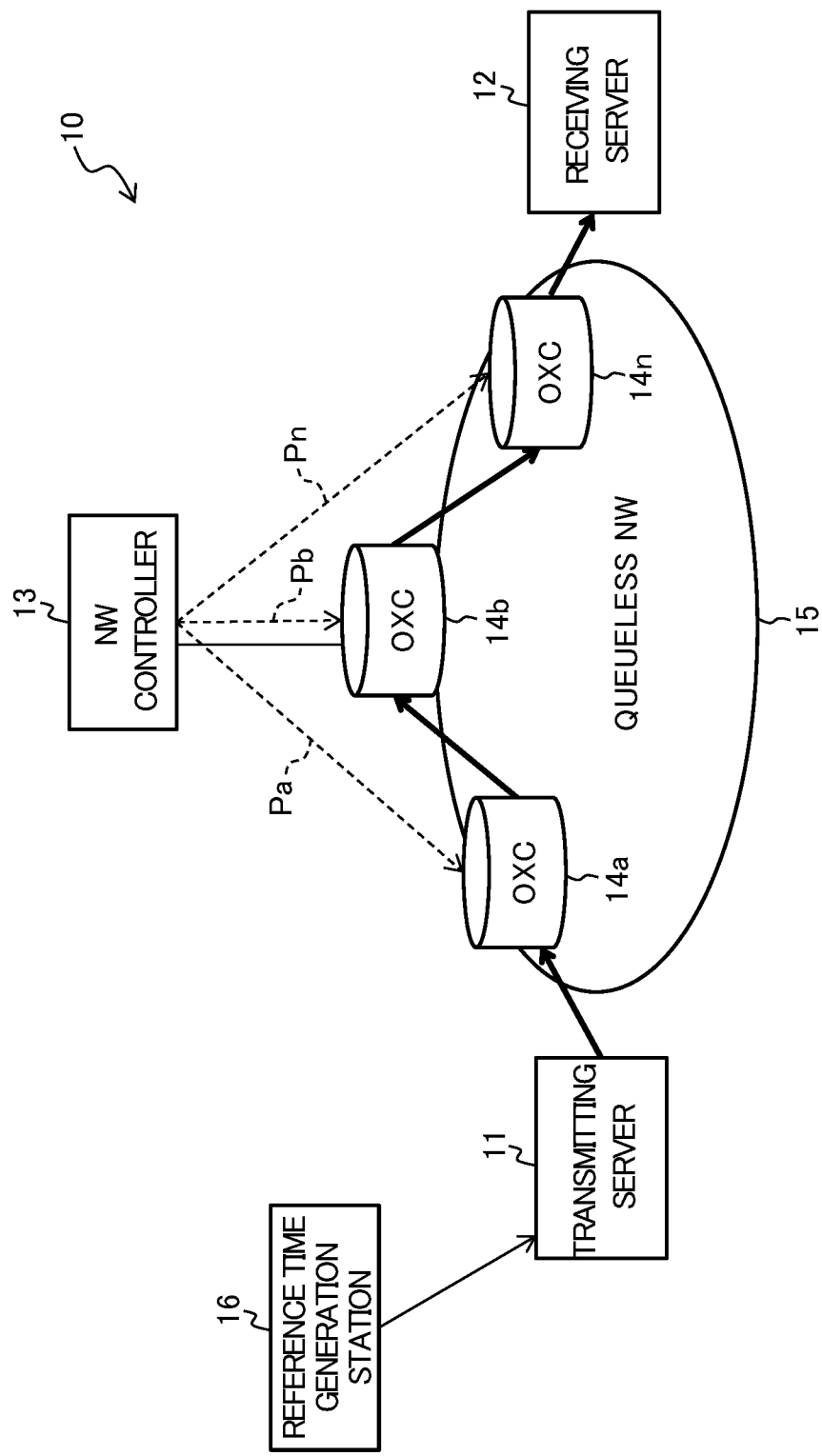
FIG. 1 is a block diagram illustrating a configuration of a time synchronization system according to a first embodiment.

Hereinafter, embodiments of the present invention will be described with reference to the drawings. Here, in all the drawings in the present description, components having corresponding functions are denoted by the same reference numerals, and description thereof will be appropriately omitted.

Configuration of First Embodiment

FIG. 1 is a block diagram illustrating a configuration of a time synchronization system according to a first embodiment of the present invention.

A time synchronization system (also referred to as a system) 10 illustrated in FIG. 1 is configured such that a transmitting server 11, a receiving server 12, and a network (NW) controller 13 are connected by optical fibers to a queueless NW 15 formed by connecting a plurality of optical cross connects (OXCs) 14a, 14b, . . . , and 14n by optical fibers, and a reference time generation station 16 is connected to the transmitting server 11 wirelessly or by an optical fiber.

The OXCs 14a to 14n connected to the queueless NW 15 are capable of performing switching processing of performing transmission of a frame signal while switching the frame signal to a destination route in the form of light without queueing. That is, the queueless NW is an NW capable of transmitting a frame signal in the form of an optical signal without queueing. The queueless NW 15 includes, for example, a photonic NW or the like that processes all transmission functions in the form of light.

The transmitting server 11 and the receiving server 12 (also referred to as servers 11 and 12) are connected by a dedicated optical line via the queueless NW 15, so that queueing of a frame signal does not occur. That is, there occurs no congestion-caused queueing like as in the conventional packet transmission. Therefore, the transmission delay time due to the optical signal between the servers 11 and 12 is a constant transmission delay time according to the transmission distance therebetween.

The reference time generation station 16 is constructed using a global positioning system (GPS), an atomic clock, or the like, and generates and transmits a reference time t that ticks with high accuracy at regular intervals.

The system 10 has a processing function of the following features. That is, a frame signal including the reference time (transmitting side current time) t is transmitted from the transmitting server 11 to the receiving server 12 via the OXCs 14a to 14n of the queueless NW The receiving server 12 receives the reference time t, and performs time synchronization control to obtain a receiving side current time ta by adding a certain transmission delay time between the receiving server 12 and the transmitting server 11 to the received transmitting side reference time t. That is, it is possible to achieve time synchronization between the transmission and receiving servers such that the time synchronization obtains receiving side current time ta delayed by a certain time from the transmitting side current time t.

Figure 2:
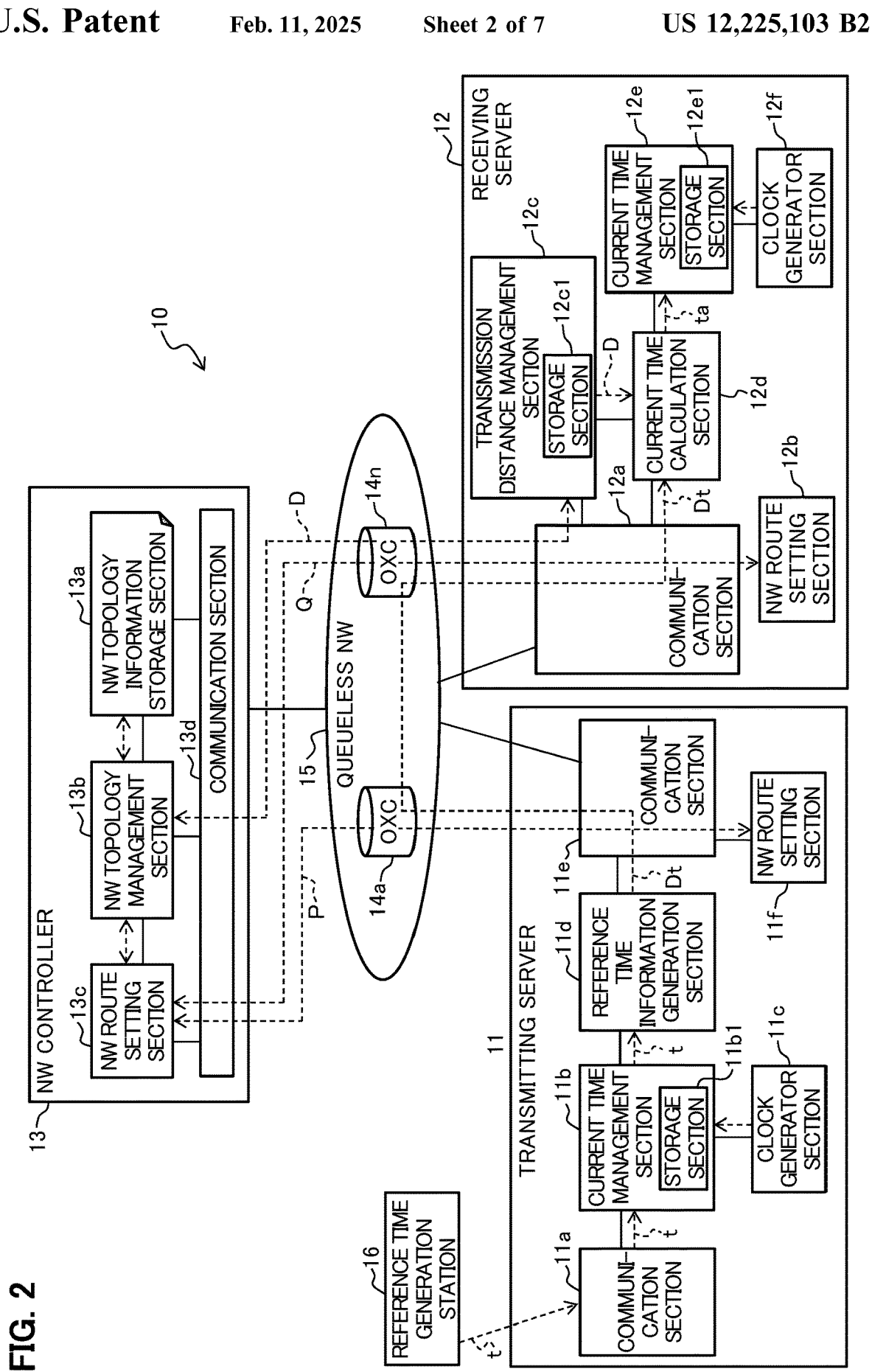
FIG. 2 is a block diagram illustrating a configuration of a transmitting server, a receiving server, and an NW controller in the time synchronization system of the first embodiment.

The NW controller 13 stores NW topology information of the queueless NW 15, and performs transmission control of an optical signal by setting an NW route or the like, which is a transmission direction of a frame signal, according to the NW topology information. As illustrated in FIG. 2, the NW controller 13 includes an NW topology information storage section 13a (also referred to as a storage section 13a), an NW topology management section 13b, an NW route setting section 13c, and a communication section 13d.

The transmitting server 11 includes a communication section 11a, a current time management section 11b including a storage section 11b1, a clock generator section 11c, a reference time information generation section 11d, a communication section 11e, and an NW route setting section 11f.

The receiving server 12 includes a communication section 12a, an NW route setting section 12b, a transmission distance management section 12c including a storage section 12c1, a current time calculation section 12d, a current time management section 12e including a storage section 12e1, and a clock generator section 12f In the NW controller 13, the communication section 13d performs communication processing of transmitting and receiving frame signals and the like to and from the transmitting server 11 and the receiving server 12 via the queueless NW 15.

The NW topology information storage section 13a stores NW topology information. The NW topology information is information representing an NW form in which a plurality of communication devices such as the transmitting server 11 and the receiving server 12 are connected to the queueless NW 15 via the OXCs 14a to 14n via optical fibers.

The NW topology management section 13b performs management of transmitting transmission distance information D on frame signals between the servers 11 and 12 to the receiving server 12 in response to a request, from the transmission distance management section 12c of the receiving server 12, for retrieving transmission distance between the servers 11 and 12. The transmission distance information D is retrieved by the NW topology management section 13b by referring to the NW topology information in the storage section 13a to retrieve the distance of the transmission path of the frame signal from the transmitting server 11 to the receiving server 12. The transmission distance information D is received by the receiving server 12 in response to the retrieval request, and is stored in the storage section 12c1 of the transmission distance management section 12c.

The NW route setting section 13c sets the NW route information P, Q indicating a transfer route of the frame signal to a transfer destination for the OXCs 14a to 14n, the transmitting server 11, and the receiving server 12 according to the NW topology information stored in the storage section 13a.

For example, the NW route setting section 13c sets, to the NW route setting section 11f of the transmitting server 11, the NW route information P for transmitting the frame signal to the receiving server 12, and sets, to the NW route setting section 12b of the receiving server 12, the NW route information Q for transmitting a frame signal to the transmitting server 11.

As illustrated in FIG. 1, the NW route setting section 13c further sets, to the OXC 14a of the queueless NW 15, NW route information Pa for transmitting a frame signal to the receiving server 12; to the OXC 14b, NW route information Pb; and to the OXC 14n, NW route information Pn.

Returning to FIG. 2, in the transmitting server 11, the communication section 11a receives the reference time t, which is generated by the reference time generation station 16 that ticks with high accuracy at regular intervals, and outputs the reference time t to the current time management section 11b (management section 11b). The management section 11b sequentially overwrites and stores the reference time t in the storage section 11b1 according to a clock signal generated by the clock generator section 11c, and manages the stored reference time t as the current time t of the transmitting side (transmitting server 11).

The reference time information generation section 11d generates reference time information Dt including the current time t stored in the storage section 11b1 and outputs the reference time information Dt to the communication section 11e.

The communication section 11e transmits the reference time information Dt to the communication section 12a of the receiving server 12 via the OXCs 14a to 14n (see FIG. 1) of the queueless NW 15 according to the route indicated by the NW route information P set in the NW route setting section 11f.

In the receiving server 12, the communication section 12a receives the reference time information Dt from the transmitting server 11, and outputs the reference time information Dt to the current time calculation section (also referred to as a calculation section) 12d.

The calculation section 12d calculates the transmission delay time td between the servers 11 and 12 by dividing the transmission distance information D stored in the storage section 12c1 by light speed c, which is the speed of the optical signal between the servers 11, 12 via the queueless NW 15, as shown in Equation (1) below. It is to be noted that light speed c is to be retrieved in advance as one item of the NW topology information according to the type of the optical fiber to be used and is to be referenced by the calculation section 12d.

Next, as shown by Equation (2) below, the calculation section 12d adds the calculated transmission delay time td to the transmitting side current time t, which is based on the reference time information Dt received by the communication section 12a, to obtain the receiving side current time ta.

$$td=D/c \qquad (1)$$

$$ta=t+td \qquad (2)$$

The current time management section 12e stores the receiving side current time ta obtained by the calculation section 12d in the storage section 12e1 according to the clock signal generated by the clock generator section 12f. In this way, the receiving side current time ta is synchronized with the transmitting side current time t with a delay of the constant transmission delay time td and stored.

Operation of First Embodiment

Figure 3:
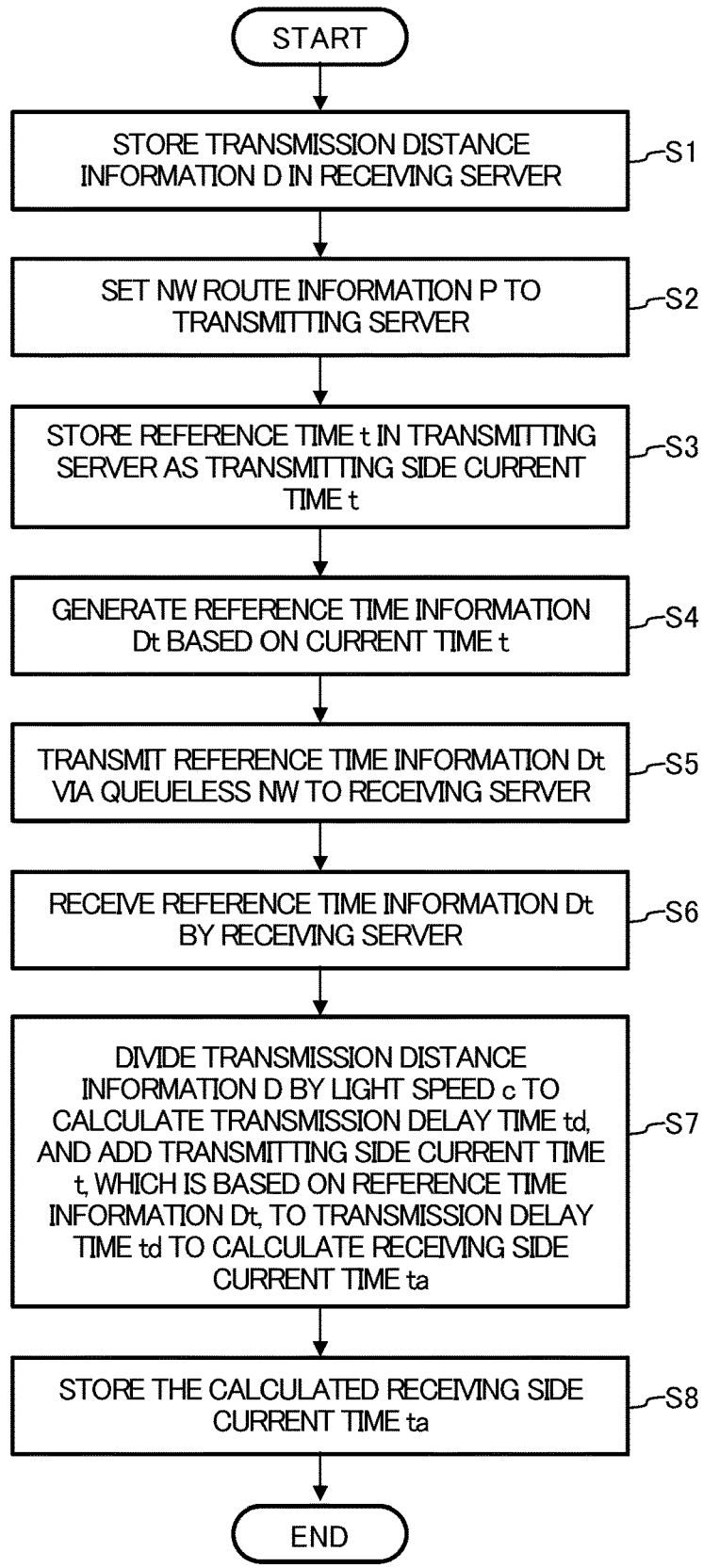
FIG. 3 is a flowchart for explaining a time synchronization operation of the time synchronization system of the first embodiment.

Next, a time synchronization operation of the time synchronization system 10 according to the first embodiment will be described with reference to the flowchart illustrated in FIG. 3. As a precondition, it is assumed that communication is performed between the transmitting server 11 and the receiving server 12 with a frame signal in the form of an optical signal. In Step S1 illustrated in FIG. 3, the transmission distance management section 12c of the receiving server 12 requests the NW topology management section 13b of the NW controller 13 to retrieve the transmission distance between the servers 11 and 12. In response to this request, the management section 13b refers to the NW topology information in the storage section 13a to retrieve the distance of the transmission path of the frame signal from the transmitting server 11 to the receiving server 12 to obtain the transmission distance information D. The transmission distance information D is transmitted to the receiving server 12 and stored in the storage section 12c1 of the transmission distance management section 12c.

In Step S2, after the NW topology management section 13b obtains the transmission distance information D, the NW route setting section 13c refers to the NW topology information to obtain NW route information P indicating the transmission route of the frame signal from the transmitting server 11 to the receiving server 12. The NW route information P is transmitted to the transmitting server 11 and set in the NW route setting section 11f.

In Step S3, the transmitting server 11 receives the reference time t generated by the reference time generation station 16 in the communication section 11a, and stores the reference time t in the storage section 11b1 of the management section 11b as the transmitting side current time t according to the clock signal.

In Step S4, the reference time information generation section 11d generates reference time information Dt including the current time t in the storage section 11b1, and outputs the reference time information Dt to the communication section 11e.

In Step S5, the communication section 11e transmits the reference time information Dt to the receiving server 12 via the OXCs 14a to 14n (see FIG. 1) of the queueless NW 15 based on the NW route information P set in the NW route setting section 11f. The transmitted reference time information Dt is superimposed on the frame signal and transmitted to the receiving server 12 via the queueless NW 15.

In Step S6, the receiving server 12 receives the reference time information Dt from the transmitting server 11 in the communication section 12a, and outputs the reference time information Dt to the calculation section 12d.

In Step S7, the calculation section 12d divides the transmission distance information D of the storage section 12c1 by light speed c to calculate the transmission delay time td between the servers 11 and 12. Next, the calculation section 12d adds the transmission delay time td to the transmitting side current time t, which is based on the received reference time information Dt, to obtain the receiving side current time ta.

In Step S8, the current time management section 12e stores the receiving side current time ta obtained by the calculation section 12d, in the storage section 12e1.

Effects of First Embodiment

Effects of the time synchronization system 10 according to the first embodiment of the present invention will be described.

The time synchronization system 10 includes: the queueless NW 15 including the OXCs 14a to 14n each configured to perform switching processing of performing transmission of an optical signal while switching the optical signal to a destination route in the form of light, the queueless NW 15 formed by connecting the OXCs 14a to 14n with optical fibers; and the NW controller 13, the transmitting server 11, and the receiving server 12, which are connected to the queueless NW 15 so as to be able to transmit an optical signal to the queueless NW 15.

The NW controller 13 performs processing of setting the transmission distance information D on a transmission distance through which the optical signal is transmitted from the transmitting server 11 to the receiving server 12 via the queueless NW 15 to the receiving server 12 based on the NW topology information related to the queueless NW 15.

The transmitting server 11 receives the reference time t that ticks at regular intervals, and generates the reference time information Dt including the transmitting side current time t synchronized with this reference time t. The transmitting server 11 further performs processing of transmitting an optical signal on which the generated reference time information Dt is superimposed to the receiving server 12 via the queueless NW 15.

After receiving the reference time information Dt, the receiving server 12 calculates the transmission delay time td between the transmitting server 11 and the receiving server 12 by dividing the transmission distance, which is based on the transmission distance information D set by the NW controller 13, by light speed c, which is the optical signal speed in the queueless NW 15. The receiving server 12 further performs processing of calculating the receiving side current time ta by adding the calculated transmission delay time td to the transmitting side current time t, which is based on the reference time information Dt.

According to this configuration, in the queueless NW 15, the OXCs 14a to 14n connected by optical fibers perform switching processing of performing transmission of an optical signal while switching the optical signal to a destination route in the form of light. For this reason, the one-way transmission delay time td obtained by dividing the transmission distance of the optical signal from the transmitting server 11 to the receiving server 12 via the queueless NW 15, in which no queueing is performed, by light speed c, which is the speed of the optical signal transmitted through the path having the transmission distance, is constant. The receiving side current time ta is calculated by adding the transmitting side current time (reference time) t obtained from the reference time information Dt received by the receiving server 12 to the constant transmission delay time td. Therefore, it is possible to achieve time synchronization between the transmission and receiving servers such that the time synchronization obtains the current time to of the receiving side (receiving server 12) delayed by a certain time from the current time t of the transmitting side (transmitting server 11).

Modification of First Embodiment

Figure 4:
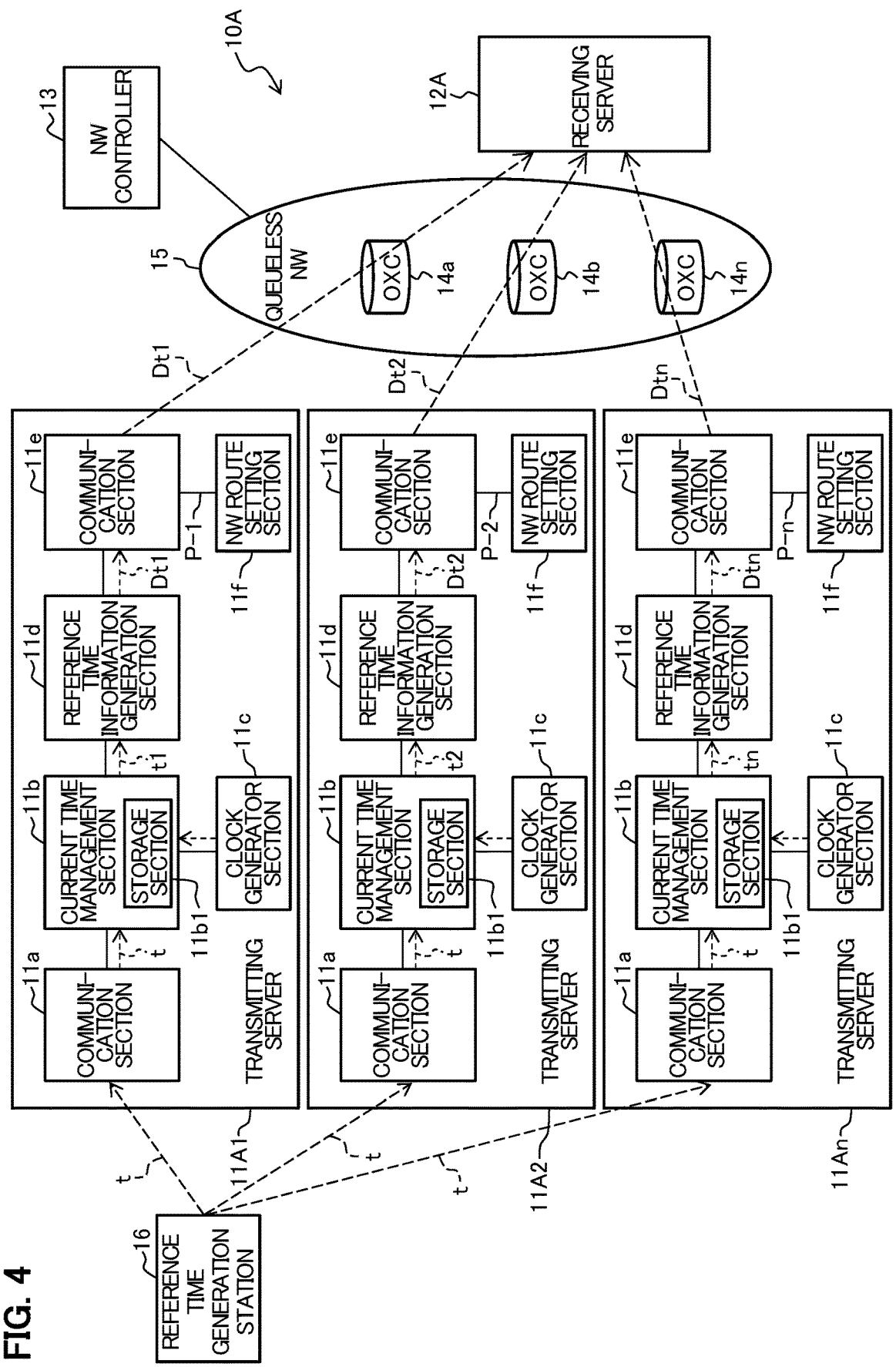
FIG. 4 is a block diagram illustrating a configuration of a time synchronization system according to a modification of the first embodiment.

FIG. 4 is a block diagram illustrating a configuration of a time synchronization system according to a modification of the first embodiment of the present invention.

A time synchronization system 10A according to the modification illustrated in FIG. 4 includes a plurality of transmitting servers 11A1, 11A2, . . . , 11An. These transmitting servers 11A1 to 11An are connected to one receiving server 12A via a queueless NW 15 by optical fibers, and a reference time generation station 16 is connected to each of the transmitting servers 11A1 to 11An wirelessly or by an optical fiber. The transmitting servers 11A1 to 11An have the same configuration but operate asynchronously with one another. In the present modification, it is assumed that the three transmitting servers 11A1, 11A2, 11An are connected to the one receiving server 12A via different paths of the queueless NW 15.

Figure 5:
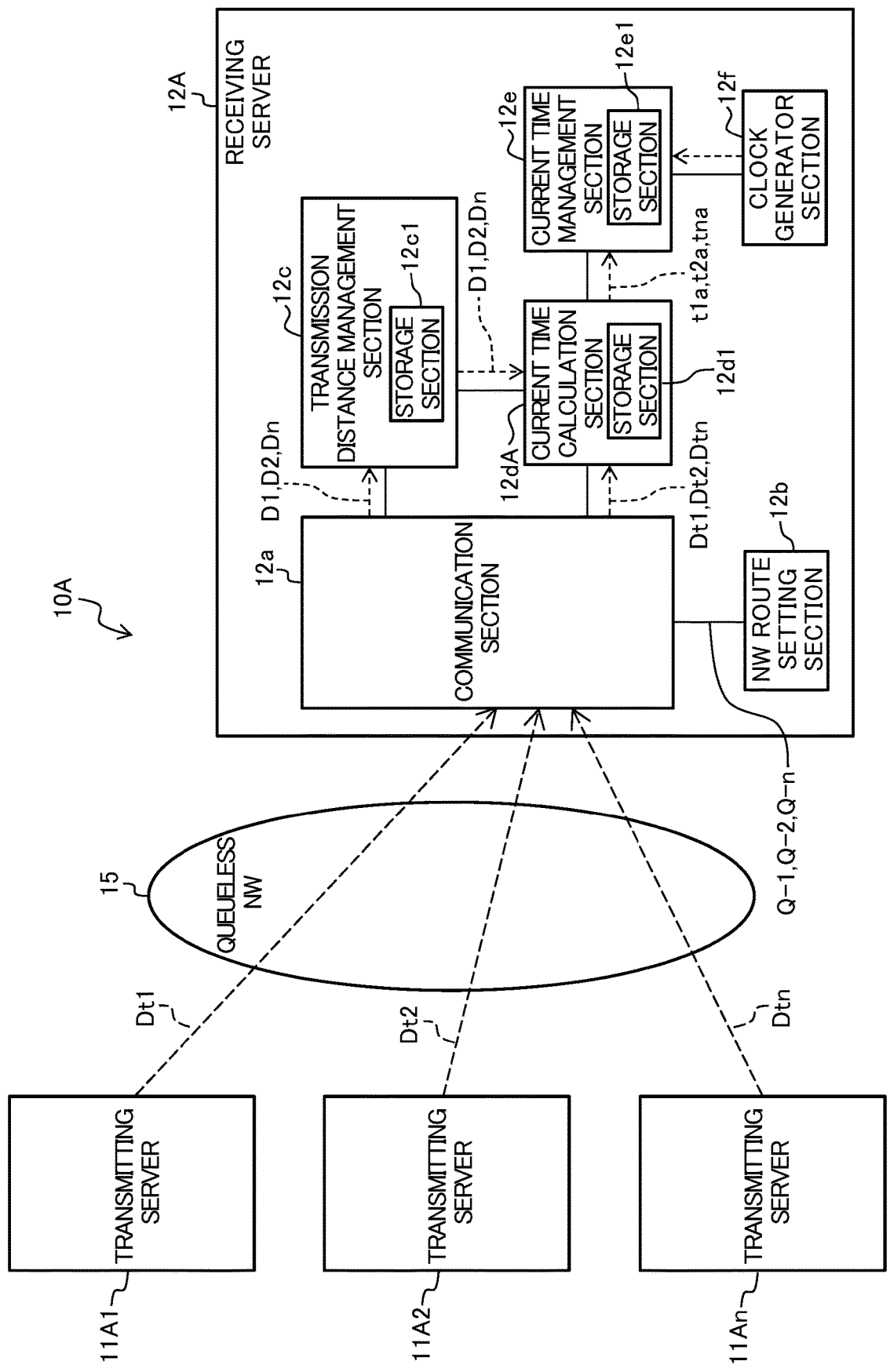
FIG. 5 is a block diagram illustrating a configuration of a receiving server in the time synchronization system according to the modification.

As illustrated in FIG. 5, the receiving server 12A includes a communication section 12a, an NW route setting section 12b, a transmission distance management section 12c including a storage section 12c1, a current time calculation section 12dA including a storage section 12d1, a current time management section 12e including a storage section 12e1, and a clock generator section 12f.

Features of the system 10A are as follows. Pieces of reference time information Dt1, Dt2, Dtn each including a transmitting side current time t are transmitted from the plurality of transmitting servers 11A1, 11A2, and 11An via the queueless NW 15, and are received by the receiving server 12A. The receiving server 12A obtains and stores the receiving side current times t1a, t2a, and Ina using the received reference time information Dt1, Dt2, and Dtn and the transmission distance information D1, D2, and Dn obtained from the NW topology information. When, for example, from the current times t1a, t2a, and Ina, an abnormality in the current time t1a is detected, the receiving server 12 performs processing of discarding the current time t1a. That is, the receiving server 12 is configured to perform processing of deleting the current time t1a and stopping the processing related to the current time t1a.

The NW topology management section 13b (FIG. 2) of the NW controller 13 illustrated in FIG. 4 refers to the NW topology information in the storage section 13a to retrieve the distance of the frame signal transmission path between the servers 11A1 and 12, the distance of the frame signal transmission path between the servers 11A2 and 12, and the distance of the frame signal transmission path between the servers 11An and 12 and obtain the transmission distance information D1, D2, and Dn (see FIG. 5).

In response to transmission distance retrieval requests from the transmission distance management section 12c of the receiving server 12A illustrated in FIG. 5, the NW topology management section 13b transmits the transmission distance information D1 of the frame signal between the servers 11A1 and 12, the transmission distance information D2 of the frame signal between the servers 11A2 and 12, and the transmission distance information Dn of the frame signal between the servers 11An and 12 to the receiving server 12A. The transmitted pieces of transmission distance information D1, D2, and Dn are stored in the storage section 12c1 of the transmission distance management section 12c.

When the transmission path of the frame signal between the servers 11A1 and 12, the transmission path of the frame signal between the servers 11A2 and 12, or the transmission path of the frame signal between the servers 11An and 12 is changed, the corresponding transmission distance information D1, D2, or Dn is obtained by re-retrieving the NW topology information by the NW topology management section 13b.

The NW route setting section 13c (FIG. 2) sets, according to the NW topology information, the NW route information indicating a transfer route of the frame signal to a transfer destination to the OXCs 14a to 14n, the transmitting servers 11A1, 11A2, 11An, and the receiving server 12A.

That is, the NW route setting section 13c (FIG. 2) sets NW route information P-1, P-2, P-n (FIG. 4) for transmitting a frame signal to the receiving server 12A to NW route setting sections 11f of the transmitting servers 11A1, 11A2, 11An, and sets NW route information Q-1, Q-2, Q-n (FIG. 5) for transmitting a frame signal to the transmitting servers 11A1, 11A2, 11An to the NW route setting section 12b of the receiving server 12A. The NW route setting section 13c sets NW route information Pa, Pb, Pn (FIG. 1) to the OXCs 14a to 14n.

As illustrated in FIG. 4, in the transmitting server 11A1, the communication section 11a receives the reference time t generated by the reference time generation station 16, and the management section 11b stores and manages the received reference time t in the storage section 11b1 as the current time t1 of the transmitting side (transmitting server 11A1). Next, the reference time information generation section 11d generates reference time information Dt1 including the current time t1 stored in the storage section 11b1, and transmits the reference time information Dt1 from the communication section 11e to the receiving server 12A via the queueless NW 15 at regular intervals according to the route indicated by the NW route information P-1.

In the transmitting server 11A2, the management section 11b stores the reference time t received by the communication section 11a in the storage section 11b1 as the transmitting side current time t2, and the generation section 11d generates the reference time information Dt2 based on the stored current time t2 and transmits the reference time information Dt2 from the communication section 11e to the receiving server 12A via the queueless NW 15 at regular intervals according to the route indicated by the NW route information P-2.

In the transmitting server 11An, the management section 11b stores the reference time t in the storage section 11b1 as the transmitting side current time tn, and the generation section 11d generates the reference time information Dtn based on the current time tn and transmits the reference time information Dtn from the communication section 11e to the receiving server 12A via the queueless NW 15 at regular intervals according to the route indicated by the NW route information P-n.

The communication section 12a of the receiving server 12A illustrated in FIG. 5 individually receives the reference time information Dt1, Dt2, Dtn transmitted respectively from the transmitting servers 11A1, 11A2, 11An at regular intervals, and outputs the reference time information Dt1, Dt2, Dtn to the calculation section 12dA including the storage section 12d1.

According to Equation (1) described above, the calculation section 12dA divides the transmission distance information D1 (D in Equation (1) is read as D1) stored in the storage section 12c1 by light speed c to calculate a transmission delay time t1d between the servers 11A1 and 12 (td in Equation (1) is read as t1d).

Next, according to Equation (2) described above, the calculation section 12dA adds the calculated transmission delay time t1d to the transmitting side current time t1 (t in Equation (2) is read as t1), which is based on the reference time information Dt1 received from the transmitting server 11A1, to obtain a receiving side current time t1a (ta in Equation (2) is read as t1a), and stores the transmitting side current time t1a in the storage section 12d1. This storing operation is performed at a plurality of times consecutively for the receiving side current time t1a.

Similarly to this, the calculation section 12dA divides the transmission distance information D2 by light speed c to calculate the transmission delay time t2d between the servers 11A2 and 12. Further, the calculation section 12d adds the calculated transmission delay time t2d to the transmitting side current time t2, which is based on the above-described received reference time information Dt2, to obtain the receiving side current time t2a, and similarly to the above, stores the receiving side current time t2a in the storage section 12d1.

Similarly, the calculation section 12dA divides the transmission distance information Dn by light speed c to calculate the transmission delay time tnd between the servers 11An and 12. Further, the calculation section 12d adds the calculated transmission delay time tnd to the transmitting side current time tn, which is based on the above-described received reference time information Dtn, to obtain the receiving side current time tna, and similarly to the above, stores the receiving side current time tna in the storage section 12d1.

Next, the calculation section 12dA performs processing of detecting abnormalities of the receiving side current times t1a, t2a, and tna stored in the storage section 12d1. Specifically, regarding a receiving side current time stored in the storage section 12d1 for the same server, e.g., the receiving side current time t1a for the transmitting server 11A1, when the time difference between the current time t1a stored this time and the current time t1a stored last time (time difference relevant to this storing operation and the last storing operation) differs from the time difference relevant to the last storing operation and the storing operation preceding the last storing operation by a predetermined threshold value or more, the calculation section 12dA detects that the current time t1a stored this time is abnormal. After this detection, processing of discarding the current time t1a is performed. Specifically, the calculation section 12dA performs processing of deleting the current time t1a from the storage section 12d1 and stopping the processing related to the current time t1a.

According to the system 10A having such a configuration, in a case where the transmission path of the optical signal via the queueless NW 15 between the transmitting server 11A1, 11A2, or 11An and the receiving server 12 is changed, variation in the transmission delay of the optical signal due to the change can be restrained as described later.

Note that, the change in the transmission path may be caused, for example, in a case where the queueless NW 15 is partially damaged due to a crustal deformation such as an earthquake or in a case where a communication device such as the OXCs 14a to 14l of the queueless NW 15 fails.

For example, assume that a change occurs in the transmission path of the optical signal between the transmitting server 11A1 and the receiving server 12 such that transmission path becomes significantly long or significantly short. In this case, the NW topology management section 13b illustrated in FIG. 2 refers to the NW topology information in the storage section 13a to re-retrieve the distance of the frame signal transmission path between the servers 11A1 and 12. Through this re-retrieval, the management section 13b retrieves fresh transmission distance information D1 (referred to as new transmission distance information D1). The new transmission distance information D1 is transmitted to the receiving server 12A illustrated in FIG. 5 in response to a transmission distance retrieval request from the receiving server 12A, and is overwritten in the storage section 12c1 of the transmission distance management section 12c.

Thereafter, the receiving server 12A receives the reference time information Dt1 transmitted from the transmitting server 11A1 and outputs the reference time information Dt1 to the calculation section 12dA. The calculation section 12dA divides the new transmission distance information D1 that has been overwritten on the storage section 12c1 by light speed c to calculate the transmission delay time t1d between the servers 11A1 and 12. Then, the calculation section 12d adds the calculated transmission delay time t1d to the transmitting side current time t1, which is based on the reference time information Dt1 received from the transmitting server 11A1, to obtain the receiving side current time t1a, and stores the receiving side current time t1a in the storage section 12d1.

Next, assume that, regarding the stored receiving side current time t1a for the transmitting server 11A1, the calculation section 12dA detects a state in which the difference between the time t1a of this time and the time t1a of the last time differs from the difference between the time t1a of the last time and the time t1a of the time preceding the last time by a threshold value or more. In this case, the calculation section 12d detects that the receiving side current time t1a related to the transmitting server 11A1 is abnormal. After this detection, the calculation section 12dA performs processing of deleting the current time t1a from the storage section 12d1 and stopping processing related to the current time t1a.

Here, assume that no abnormality is detected from the receiving side current times t2a, tna of the other transmitting servers 11A2, 11An. In this case, the calculation section 12d stores the current times t2a, tna in the storage section 12e1 of the current time management section 12e. As a result, for example, it is possible to achieve time synchronization that obtains the current time t2a of the receiving side (receiving server 12A) delayed by a certain time from the current time t2 of the transmitting side (transmitting server 11A2). With such processing, it is possible to reduce the influence of a failure of the queueless NW 15 and achieve time synchronization between the transmission and receiving servers.

Configuration of Second Embodiment

Figure 6:
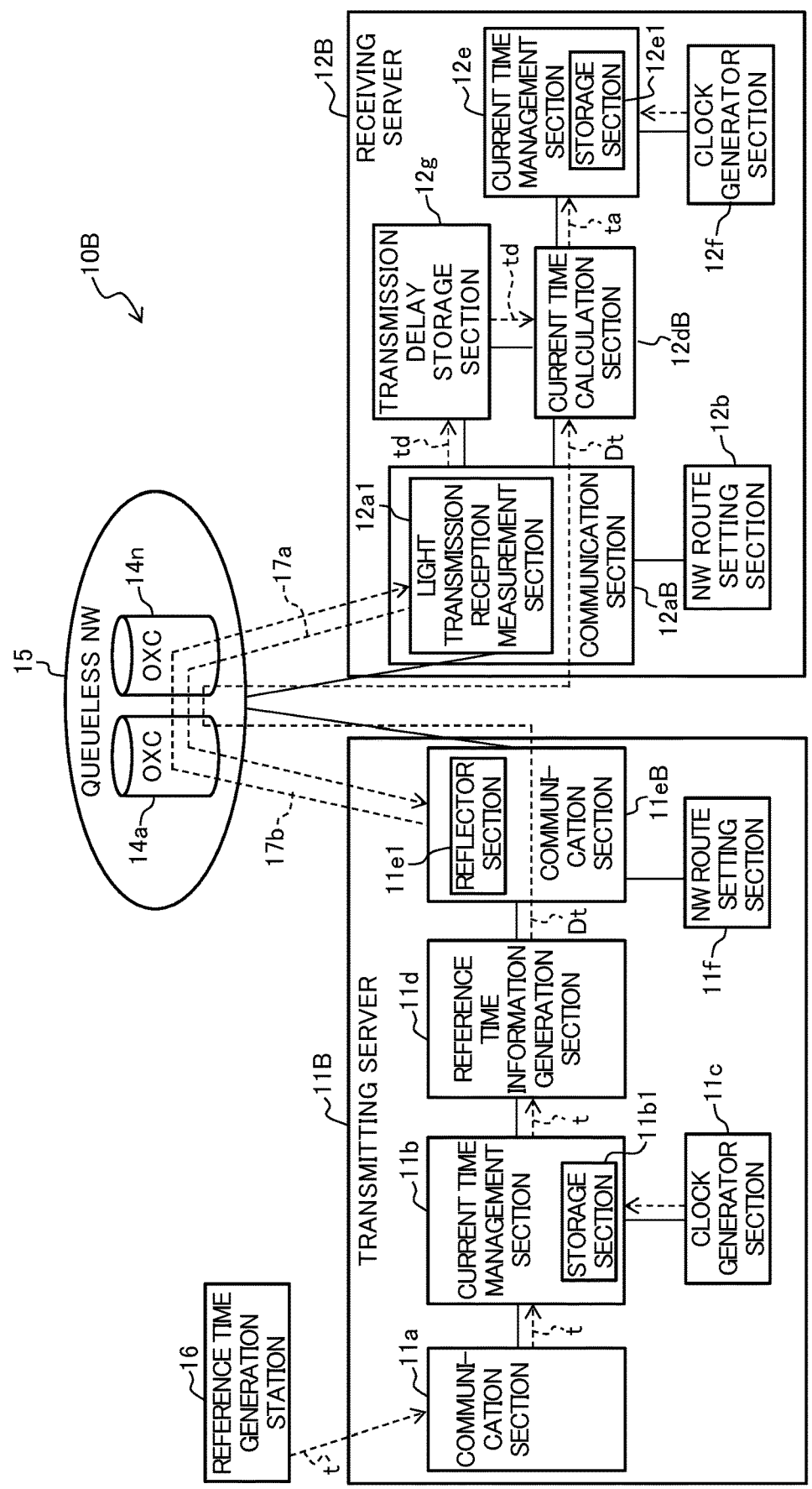
FIG. 6 is a block diagram illustrating a configuration of a time synchronization system according to a second embodiment.

FIG. 6 is a block diagram illustrating a configuration of a time synchronization system according to a second embodiment of the present invention.

A time synchronization system 10B of the second embodiment illustrated in FIG. 6 is configured such that a transmitting server 11B and a receiving server 12B are each connected by an optical fiber to a queueless NW 15 formed by connecting a plurality of OXCs 14a to 14n by optical fibers, and a reference time generation station 16 is connected to the transmitting server 11B wirelessly or by an optical fiber.

Features of the system 10B are as follows. The receiving server 12B transmits test light 17a to the transmitting server 11B via the queueless NW 15 and receives reflected light 17b, which is reflection of the test light 17a by the transmitting server 11B, to measure a round-trip transmission delay time. The receiving server 12B divides the measured round-trip transmission delay time by 2 to obtain a one-way transmission delay time td and store the one-way transmission delay time td. Thereafter, the receiving server 12B adds the stored transmission delay time td to the current time t received from the transmitting server 11B via the queueless NW 15 to obtain a receiving side current time ta.

The transmitting server 11B includes a communication section 11a, a current time management section 11b including a storage section 11b1, a clock generator section 11c, a reference time information generation section 11d, a communication section 11eB including a light reflector section 11e1, and an NW route setting section 11f.

The reflector section 11e1 is an end surface or the like of an optical fiber connected to the communication section 11eB of the transmitting server 11B. The reflector section 11e1 reflects the test light 17a transmitted from the receiving server 12B to return the reflected light 17b to the receiving server 12B via a reverse path.

In the NW route setting section 11f, NW route information for transmitting a frame signal in the form of an optical signal to the receiving server 12B between the transmitting server 11B and the receiving server 12 via the queueless NW 15 is set in advance.

The receiving server 12B includes a communication section 12aB including a light transmission reception measurement section 12a1, an NW route setting section 12b, a transmission delay storage section 12g, a current time calculation section 12dB, a current time management section 12e, and a clock generator section 12f.

In the NW route setting section 12b, NW route information for reversely following the NW route set in the NW route setting section 11f of the transmitting server 11B is set in advance.

NW route information for transmitting an optical signal to the receiving server 12B or to the transmitting server 11B is also set in advance in the OXCs 14a to 14n of the queueless NW 15.

The light transmission reception measurement section (also referred to as a measurement section) 12a1 transmits the test light 17a to the transmitting server 11B via the queueless NW 15 according to the NW route information set in the NW route setting section 12b. Moreover, the measurement section 12a1 receives the reflected light 17b from the reflector section 11e1 of the transmitting server 11B after the transmission to measure a round-trip transmission delay time, and divides the round-trip transmission delay time by 2 to obtain a one-way transmission delay time td. As the transmission delay time td is obtained from the round-trip transmission delay time obtained by reciprocation of the optical signal, the transmission delay time td is a constant time. The constant transmission delay time td is stored in the transmission delay storage section 12g.

For the measurement section 12a1, an optical time domain reflectometer (OTDR) capable of measuring the round-trip transmission time of a light pulse reflected while moving along the optical fiber path and measuring the round-trip transmission distance, or the like is applied.

The communication section 12aB of the receiving server 12B receives the reference time information Dt transmitted from the transmitting server 11B, and outputs the reference time information Dt to the calculation section 12dB.

The calculation section 12dB obtains the receiving side current time ta using the reference time information Dt received from the transmitting server 11B and the transmission delay time td stored in the storage section 12g, as follows. That is, the calculation section 12dB adds the stored transmission delay time td to the transmitting side current time t, which is based on the reference time information Dt, to obtain the receiving side current time ta, and stores the receiving side current time ta in the storage section 12e1 of the current time management section 12e.

Operation of Second Embodiment

Next, a time synchronization operation of the time synchronization system 10B according to the second embodiment will be described with reference to the flowchart illustrated in FIG. 7.

In Step S11 illustrated in FIG. 7, the receiving server 12B illustrated in FIG. 6 transmits the test light 17a from the light transmission reception measurement section 12a1 to the transmitting server 11B via the queueless NW 15 based on the NW route information set in the NW route setting section 12b. The measurement section 12a1 receives the reflected light 17b, which is reflection of the transmitted test light 17a by the reflector section 11e1 of the transmitting server 11B, to measure the round-trip transmission delay time. Further, the measurement section 12a1 divides the round-trip transmission delay time by 2 to obtain a constant, one-way transmission delay time td, and stores the one-way transmission delay time td in the transmission delay storage section 12g.

In Step S12, the transmitting server 11B receives, by the communication section 11a, the reference time t generated by the reference time generation station 16 and stores the reference time tin the storage section 11b1 of the management section 11b as the transmitting side current time t.

In Step S13, the reference time information generation section 11d generates the reference time information Dt including the current time t of the storage section 11b1, superimposes the reference time information Dt on a frame signal in the form of an optical signal, and outputs the frame signal to the communication section 11eB.

In Step S14, the communication section 11eB transmits the reference time information Dt to the receiving server 12B via the queueless NW 15 according to the NW route information set in the NW route setting section 11f. At the time of this transmission, the reference time information Dt is superimposed on the frame signal and transmitted to the receiving server 12B.

In Step S15, the receiving server 12B receives the reference time information Dt by the communication section 12aB and outputs the reference time information Dt to the calculation section 12dB.

In Step S16, the calculation section 12dB adds the transmission delay time td stored in the transmission delay storage section 12g to the transmitting side current time t, which is based on the received reference time information Dt, to obtain the receiving side current time ta.

In Step S17, the current time management section 12e stores the receiving side current time ta obtained by the calculation section 12dB in the storage section 12e1.

Effects of Second Embodiment

Effects of the time synchronization system 10B according to the second embodiment will be described.

The time synchronization system 10B includes: the OXCs 14a to 14n that perform switching processing of performing transmission of an optical signal while switching the optical signal to a destination route in the form of light; the queueless NW 15 formed by connecting the OXCs 14a to 14n with optical fibers; and the transmitting server 11B and the receiving server 12B, which are connected to the queueless NW 15 so as to be able to transmit an optical signal to the queueless NW 15.

The receiving server 12B transmits test light 17a to the transmitting server 11B via the queueless NW 15 and receives reflected light 17b, which is reflection of the transmitted test light 17a by the reflector section 11e1 of the transmitting server 11B, to measure the round-trip transmission delay time. The receiving server 12 further includes a light transmission reception measurement section 12a1 that divides the measured round-trip transmission delay time by 2 to obtain the one-way transmission delay time td.

The transmitting server 11B performs processing of: receiving a reference time t that ticks at regular intervals; generating reference time information Dt based on a transmitting side current time t synchronized with the received reference time t; and transmitting an optical signal on which the generated reference time information Dt is superimposed to the receiving server 12B via the queueless NW 15.

The receiving server 12B performs processing of: receiving the reference time information Dt; and adding the transmission delay time td obtained by the light transmission reception measurement section 12a1 to the transmitting side current time t, which is based on the received reference time information Dt, to calculate a receiving side current time ta.

According to this configuration, the one-way transmission delay time td to be obtained by the light transmission reception measurement section 12a1 of the receiving server 12B is obtained by dividing the round-trip transmission delay time in which the optical signal reciprocates between the receiving server 12B and the transmitting server 11B via the queueless NW 15, in which no queueing is performed, by 2. Therefore, the one-way transmission delay time td is a constant time. The transmitting side current time t, which is based on the reference time information Dt received by the receiving server 12B, is added to the constant transmission delay time td to calculate the receiving side current time ta. Therefore, it is possible to achieve time synchronization between the transmission and receiving servers such that the time synchronization obtains the current time of the receiving side (receiving server 12B) delayed by a certain time from the current time of the transmitting side (transmitting server 11B).

Effects (1) A time synchronization system includes: a queueless network (NW) including an optical cross connect (OXC) configured to perform switching processing of performing transmission of an optical signal while switching the optical signal to a destination route in the form of light, the queueless NW formed by connecting a plurality of the OXCs by optical fibers; and an NW controller, a transmitting server, and a receiving server, which are connected to the queueless NW so as to be able to transmit an optical signal. The NW controller is configured to perform processing of setting, based on NW topology information related to the queueless NW, transmission distance information on a transmission distance through which an optical signal is transmitted from the transmitting server to the receiving server via the queueless NW to the receiving server. The transmitting server is configured to perform processing of: receiving a reference time that ticks at regular intervals; generating reference time information based on a transmitting side current time synchronized with the received reference time; and transmitting an optical signal on which the generated reference time information is superimposed to the receiving server via the queueless NW. The receiving server is configured to perform processing of: after receiving the reference time information, dividing the transmission distance, which is based on the transmission distance information set by the NW controller, by a light speed, which is an optical signal speed in the queueless NW, to calculate a transmission delay time between the transmitting server and the receiving server; and adding the calculated transmission delay time to the transmitting side current time, which is based on the reference time information, to calculate a receiving side current time.

According to this configuration, in the queueless NW, the OXCs connected by optical fibers perform switching processing of performing transmission of an optical signal while switching the optical signal to a destination route in the form of light. For this reason, the transmission delay time obtained by dividing the transmission distance of the optical signal transmitted from the transmitting server to the receiving server via the queueless NW, in which no queueing is performed, by the light speed, which is the speed of the optical signal transmitted through the path having the distance, is constant. The receiving side current time is calculated by adding the transmitting side current time (reference time), which is based on the reference time information received by the receiving server, to the constant transmission delay time. Therefore, it is possible to achieve time synchronization between the transmission and receiving servers such that the time synchronization obtains the current time of the receiving side (receiving server) delayed by a certain time from the current time of the transmitting side (transmitting server).

(2) The time synchronization system according to (1) further includes a plurality of the transmitting servers, each of which is configured to transmit the reference time information to the receiving server via the queueless NW. The NW controller is further configured to, for each of the plurality of the transmitting servers, based on the NW topology information, set transmission distance information on a transmission distance through which an optical signal is transmitted from the transmitting server to the receiving server via the queueless NW. The receiving server is further configured to: after receiving the reference time information for each of the plurality of transmitting servers, calculate a receiving side current time for each of the plurality of the transmitting servers by using the transmission distance based on the transmission distance information set for the transmitting server, and detect that, regarding the calculated receiving side current time related to a transmitting server, when a time difference between a current time calculated this time and a current time calculated last time differs from a time difference between the current time calculated last time and a current time calculated at a time preceding the last time by a predetermined threshold value or more, the current time calculated this time is abnormal.

According to this configuration, when the receiving side current time related to the transmitting server is detected as abnormal by the receiving server and is discarded, the time synchronization between the transmission and receiving servers can be achieved by the normal receiving side current time related to each of the transmitting servers other than the one related to the discard. When the optical signal transmission path between a transmitting server and a receiving server via the queueless NW is changed due to a failure caused to the queueless NW 15 due to an earthquake or the like, it is possible to restrain a variation in the transmission delay of the optical signal due to the change and achieve time synchronization between the transmission and receiving servers, by the above-described discarding.

(3) A time synchronization system includes: a queueless NW including an OXC configured to perform switching processing of performing transmission of an optical signal while switching the optical signal to a destination route in the form of light, the queueless NW formed by connecting a plurality of the OXCs by optical fibers; and a transmitting server and a receiving server connected to the queueless NW so as to be able to transmit an optical signal. The receiving server is configured to perform processing of: transmitting test light to the transmitting server via the queueless NW; receiving reflected light, which is reflection of the transmitted test light by a reflector section of the transmitting server, to measure a round-trip transmission delay time; and dividing the measured round-trip transmission delay time by 2 to obtain a one-way transmission delay time. The transmitting server is configured to perform processing of: receiving a reference time that ticks at regular intervals; generating reference time information based on a transmitting side current time synchronized with the received reference time; and transmitting an optical signal on which the generated reference time information is superimposed to the receiving server via the queueless NW. The receiving server is further configured to perform processing of: receiving the reference time information; and adding the transmission delay time to the transmitting side current time, which is based on the received reference time information, to calculate a receiving side current time.

According to this configuration, the one-way transmission delay time to be obtained by the light transmission reception measurement section of the receiving server is obtained by dividing the round-trip transmission delay time in which the optical signal reciprocates between the receiving server and the transmitting server via the queueless NW, in which no queueing is performed, by 2. Therefore, the one-way transmission delay time is a constant time. The transmitting side current time, which is based on the reference time information received by the receiving server, is added to the constant transmission delay time to calculate the receiving side current time. As a result, it is possible to achieve time synchronization between the transmission and receiving servers such that the time synchronization obtains the current time of the receiving side (receiving server) delayed by a certain time from the current time of the transmitting side (transmitting server).

(4) A receiving server is configured to receive an optical signal from a transmitting server, wherein the transmitting server and the receiving server are connected via a queueless NW including an OXC configured to perform switching processing of performing transmission of the optical signal while switching the optical signal to a destination route in the form of light, the queueless NW formed by connecting a plurality of the OXCs by optical fibers. The receiving server is further configured to perform processing of: retrieving transmission distance information on a transmission distance through which the optical signal is transmitted between the transmitting server and the receiving server; receiving an optical signal on which reference time information based on a transmitting side current time having been synchronized with a reference time that ticks at regular intervals is superimposed from the transmitting server; dividing the transmission distance, which is based on the retrieved transmission distance information, by a light speed, which is an optical signal speed in the queueless NW, to calculate a transmission delay time between the transmitting server and the receiving server, and adding the calculated transmission delay time to the transmitting side current time, which is based on the received reference time information, to calculate a receiving side current time.

According to this configuration, the transmitting side current time (reference time) based on the reference time information received by the receiving server is added to a constant transmission delay time between the transmitting server and the receiving server via the queueless NW, in which no queueing is performed due to the nature of the optical signal transmission processing, to calculate the receiving side current time. Therefore, the receiving server can achieve time synchronization between the transmission and receiving servers such that the time synchronization obtains the current time of the receiving side (receiving server) delayed by a certain time from the current time of the transmitting side (transmitting server).

(5) A receiving server is configured to receive an optical signal from a transmitting server, wherein the transmitting server and the receiving server are connected via a queueless NW including an OXC configured to perform switching processing of performing transmission of the optical signal while switching the optical signal to a destination route in the form of light, the queueless NW formed by connecting a plurality of the OXCs by optical fibers. The receiving server is further configured to perform processing of: transmitting test light to the transmitting server via the queueless NW; and receiving reflected light, which is reflection of the transmitted test light by a reflector section of the transmitting server, to measure a round-trip transmission delay time; and dividing the measured round-trip transmission delay time by 2 to obtain a one-way transmission delay time, and to perform processing of: receiving an optical signal on which reference time information based on a transmitting side current time having been synchronized with a reference time that ticks at regular intervals is superimposed from the transmitting server; and adding the transmission delay time to the transmitting side current time, which is based on the received reference time information, to calculate a receiving side current time.

According to this configuration, the round-trip transmission delay time in which the optical signal reciprocates between the receiving server and the transmitting server via the queueless NW, in which no queueing is performed due to the nature of the optical signal transmission processing, is divided by 2 to obtain a constant, one-way transmission delay time. The transmitting side current time, which is based on the reference time information received by the receiving server, is added to the constant transmission delay time to calculate the receiving side current time. As a result, the receiving server can achieve time synchronization between the transmission and receiving servers such that the time synchronization obtains the current time of the receiving side (receiving server) delayed by a certain time from the current time of the transmitting side (transmitting server).

In addition to the above, modifications can be applied to the specific configurations as appropriate without departing from the scope of the present invention.

REFERENCE SIGNS LIST 10, 10A, 10B Time synchronization system
11, 11B, 11A1, 11A2, . . . , 11An Transmitting server
11*a* Communication section
11*b* Current time management section
11*b*1 Storage section
11*c* Clock generator section
11*d* Reference time information generation section
11*e* Communication section
11*e*1 Reflector section
11*f* NW Route setting section
12, 12A, 12B Receiving server
12*a* Communication section
12*a*1 Light transmission reception measurement section
12*b* NW Route setting section
12*c* Transmission distance management section
12*c*1 Storage section
12*d*, 12*d*A, 12*d*B Current time calculation section
12*d*1 Storage section
12*e* Current time management section
12*e*1 Storage section
12*f* Clock generator section
13 NW controller
13*a* NW topology information storage section
13*b* NW Topology management section
13*c* NW Route setting section
13*d* Communication section
14*a*, 14*b*, . . . , 14*n* OXC
15 Queueless NW
16 Reference time generation station

The invention claimed is:
1. A time synchronization system comprising:
a queueless network (NW) formed by connecting a plurality of optical cross connects (OXCs) by optical fibers, each of the plurality of OXCs configured to perform switching processing of performing transmission of an optical signal while switching the optical signal to a destination route in the form of light; and
an NW controller, a plurality of transmitting servers, and a receiving server, which are connected to the queueless NW so as to be able to transmit an optical signal,
wherein the NW controller is configured to, for each of the plurality of transmitting servers, perform processing of setting, based on NW topology information related to the queueless NW, transmission distance information on a transmission distance through which an optical signal is transmitted from the transmitting server to the receiving server via the queueless NW to the receiving server,
wherein each of the plurality of transmitting servers is configured to perform processing of:
receiving a reference time that ticks at regular intervals;
generating reference time information based on a transmitting side current time synchronized with the received reference time; and
transmitting an optical signal on which the generated reference time information is superimposed to the receiving server via the queueless NW, and
wherein the receiving server is configured to perform processing of:
for each of the plurality of transmitting servers, after receiving the reference time information from the transmitting server, dividing the transmission distance, which is based on the transmission distance information set by the NW controller for the transmitting server, by a light speed, which is an optical signal speed in the queueless NW, to calculate a transmission delay time between the transmitting server and the receiving server;
for each of the plurality of transmitting servers, adding the calculated transmission delay time of the transmitting server to the transmitting side current time, which is based on the reference time information of the transmitting server, to calculate a receiving side current time related to the transmitting server; and
detecting that, regarding the calculated receiving side current time related to one transmitting server of the plurality of transmitting servers, when a time difference between a receiving side current time calculated this time for the one transmitting server and a receiving side current time calculated last time for the one transmitting server differs from a time difference between the receiving side current time calculated last time for the one transmitting server and a receiving side current time calculated at a time preceding the last time for the one transmitting server by a predetermined threshold value or more, the receiving side current time calculated this time is abnormal.

2. A receiving server configured to receive optical signals from a plurality of transmitting servers,
wherein the plurality of transmitting servers and the receiving server are connected via a queueless network (NW) formed by connecting a plurality of optical cross connects (OXCs) by optical fibers, each of the plurality of OXCs configured to perform switching processing of performing transmission of an optical signal while switching the optical signal to a destination route in the form of light, wherein the receiving server is configured to perform processing of:
- for each of the plurality of transmitting servers, retrieving transmission distance information on a transmission distance through which the optical signal is transmitted between the transmitting server and the receiving server;
- receiving an optical signal on which reference time information based on a transmitting side current time having been synchronized with a reference time that ticks at regular intervals is superimposed from each of the plurality of transmitting servers;
- for each of the plurality of transmitting servers, dividing the transmission distance, which is based on the retrieved transmission distance information retrieved for the transmitting server, by a light speed, which is an optical signal speed in the queueless NW, to calculate a transmission delay time between the transmitting server and the receiving server;
- for each of the plurality of transmitting servers, adding the calculated transmission delay time calculated for the transmitting server to the transmitting side current time, which is based on the received reference time information received from the transmitting server, to calculate a receiving side current time related to the transmitting server; and
- detecting that, regarding the calculated receiving side current time related to one transmitting server of the plurality of transmitting servers, when a time difference between a receiving side current time calculated this time for the one transmitting server and a receiving side current time calculated last time for the one transmitting server differs from a time difference between the receiving side current time calculated last time for the one transmitting server and a receiving side current time calculated at a time preceding the last time for the one transmitting server by a predetermined threshold value or more, the receiving side current time calculated this time is abnormal.

3. A time synchronization method of a time synchronization system, the time synchronization system comprising:
- a queueless network (NW) formed by connecting a plurality of optical cross connects (OXCs) by optical fibers, each of the plurality of OXCs configured to perform switching processing of performing transmission of an optical signal while switching the optical signal to a destination route in the form of light; and
- an NW controller, a plurality of transmitting servers, and a receiving server, which are connected to the queueless NW so as to be able to transmit an optical signal, the time synchronization method comprising steps of:
- by the NW controller, for each of the plurality of transmitting servers, setting, based on NW topology information related to the queueless NW, transmission distance information on a transmission distance through which an optical signal is transmitted from the transmitting server to the receiving server via the queueless NW to the receiving server;
- by each of the plurality of transmitting servers,
  receiving a reference time that ticks at regular intervals,
  generating reference time information based on a transmitting side current time synchronized with the received reference time, and
  transmitting an optical signal on which the generated reference time information is superimposed to the receiving server via the queueless NW;
- by the receiving server, for each of the plurality of transmitting servers, after receiving the reference time information from the transmitting server, dividing the transmission distance, which is based on the transmission distance information set by the NW controller for the transmitting server, by a light speed, which is an optical signal speed in the queueless NW, to calculate a transmission delay time between the transmitting server and the receiving server;
- by the receiving server, for each of the plurality of transmitting servers, adding, by the receiving server, the calculated transmission delay time of the transmitting server to the transmitting side current time, which is based on the reference time information of the transmitting server, to calculate a receiving side current time related to the transmitting server; and
- by the receiving server, detecting that, regarding the calculated receiving side current time related to one transmitting server of the plurality of transmitting servers, when a time difference between a receiving side current time calculated this time for the one transmitting server and a receiving side current time calculated last time for the one transmitting server differs from a time difference between the receiving side current time calculated last time for the one transmitting server and a receiving side current time calculated at a time preceding the last time for the one transmitting server by a predetermined threshold value or more, the receiving side current time calculated this time is abnormal.

4. A time synchronization system comprising:
- a queueless network (NW) formed by connecting a plurality of optical cross connects (OXCs) by optical fibers, each of the plurality of OXCs configured to perform switching processing of performing transmission of an optical signal while switching the optical signal to a destination route in the form of light; and
- an NW controller, a plurality of transmitting servers, and a receiving server, which are connected to the queueless NW so as to be able to transmit an optical signal, wherein the NW controller is configured to, for each of the plurality of transmitting servers, perform processing of setting, based on NW topology information related to the queueless NW, transmission distance information on a transmission distance through which an optical signal is transmitted from the transmitting server to the receiving server via the queueless NW to the receiving server, wherein each of the plurality of transmitting servers is configured to perform processing of:
- receiving a reference time that ticks at regular intervals;
- generating reference time information based on a transmitting side current time synchronized with the received reference time; and
- transmitting an optical signal on which the generated reference time information is superimposed to the receiving server via the queueless NW, and wherein the receiving server is configured to perform processing of:
- for each of the plurality of transmitting servers, after receiving the reference time information from the transmitting server, dividing the transmission distance, which is based on the transmission distance information set by the NW controller for the transmitting server, by a light speed, which is an optical signal speed in the queueless NW, to calculate a transmission delay time between the transmitting server and the receiving server;

for each of the plurality of transmitting servers, adding the calculated transmission delay time of the transmitting server to the transmitting side current time, which is based on the reference time information of the transmitting server, to calculate a receiving side current time related to the transmitting server; and detecting that, regarding the calculated receiving side current time related to one transmitting server of the plurality of transmitting servers, when a receiving side current time calculated this time for the one transmitting server differs from a receiving side current time calculated in the past for the one transmitting server, the receiving side current time calculated this time is abnormal.

5. A receiving server configured to receive optical signals from a plurality of transmitting servers, wherein the plurality of transmitting servers and the receiving server are connected via a queueless network (NW) formed by connecting a plurality of optical cross connects (OXCs) by optical fibers, each of the plurality of OXCs configured to perform switching processing of performing transmission of an optical signal while switching the optical signal to a destination route in the form of light, wherein the receiving server is configured to perform processing of:

for each of the plurality of transmitting servers, retrieving transmission distance information on a transmission distance through which the optical signal is transmitted between the transmitting server and the receiving server;

receiving an optical signal on which reference time information based on a transmitting side current time having been synchronized with a reference time that ticks at regular intervals is superimposed from each of the plurality of transmitting servers;

for each of the plurality of transmitting servers, dividing the transmission distance, which is based on the retrieved transmission distance information retrieved for the transmitting server, by a light speed, which is an optical signal speed in the queueless NW, to calculate a transmission delay time between the transmitting server and the receiving server;

for each of the plurality of transmitting servers, adding the calculated transmission delay time calculated for the transmitting server to the transmitting side current time, which is based on the received reference time information received from the transmitting server, to calculate a receiving side current time related to the transmitting server; and detecting that, regarding the calculated receiving side current time related to one transmitting server of the plurality of transmitting servers, when a receiving side current time calculated this time for the one transmitting server differs from a receiving side current time calculated in the past for the one transmitting server, the receiving side current time calculated this time is abnormal.

6. A time synchronization method of a time synchronization system, the time synchronization system comprising:

a queueless network (NW) formed by connecting a plurality of optical cross connects (OXCs) by optical fibers, each of the plurality of OXCs configured to perform switching processing of performing transmission of an optical signal while switching the optical signal to a destination route in the form of light; and an NW controller, a plurality of transmitting servers, and a receiving server, which are connected to the queueless NW so as to be able to transmit an optical signal, the time synchronization method comprising steps of:

by the NW controller, for each of the plurality of transmitting servers, setting, based on NW topology information related to the queueless NW, transmission distance information on a transmission distance through which an optical signal is transmitted from the transmitting server to the receiving server via the queueless NW to the receiving server;

by each of the plurality of transmitting servers, receiving a reference time that ticks at regular intervals, generating reference time information based on a transmitting side current time synchronized with the received reference time, and transmitting an optical signal on which the generated reference time information is superimposed to the receiving server via the queueless NW;

by the receiving server, for each of the plurality of transmitting servers, after receiving the reference time information from the transmitting server, dividing the transmission distance, which is based on the transmission distance information set by the NW controller for the transmitting server, by a light speed, which is an optical signal speed in the queueless NW, to calculate a transmission delay time between the transmitting server and the receiving server;

by the receiving server, for each of the plurality of transmitting servers, adding the calculated transmission delay time of the transmitting server to the transmitting side current time, which is based on the reference time information of the transmitting server, to calculate a receiving side current time related to the transmitting server; and by the receiving server, detecting that, regarding the calculated receiving side current time related to one transmitting server of the plurality of transmitting servers, when a receiving side current time calculated this time for the one transmitting server differs from a receiving side current time calculated in the past for the one transmitting server, the receiving side current time calculated this time is abnormal.

* * * * *